E. BENNETT.
Saw Mill Dog.

No. 232,924. Patented Oct. 5, 1880.

WITNESSES:
C. Neveux
C. Sedgwick

INVENTOR:
E. Bennett
BY Munn & Co.
ATTORNEYS.

UNITED STATES PATENT OFFICE.

ELWOOD BENNETT, OF KOKOMO, INDIANA.

SAW-MILL DOG.

SPECIFICATION forming part of Letters Patent No. 232,924, dated October 5, 1880.

Application filed February 17, 1880.

*To all whom it may concern:*

Be it known that I, ELWOOD BENNETT, of Kokomo, in the county of Howard and State of Indiana, have invented a new and useful Improvement in Saw-Mill Dogs, of which the following is a specification.

Figure 1:
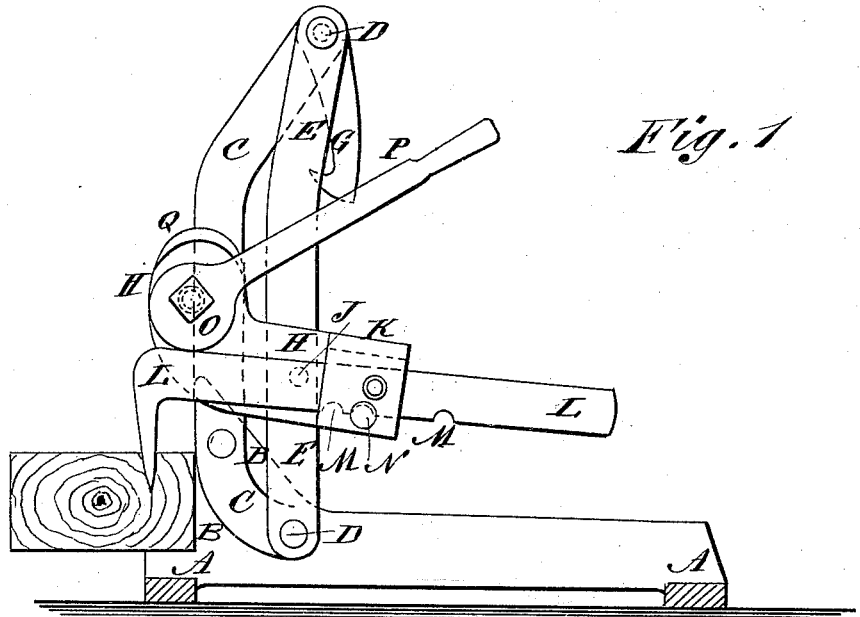
Figure 2:
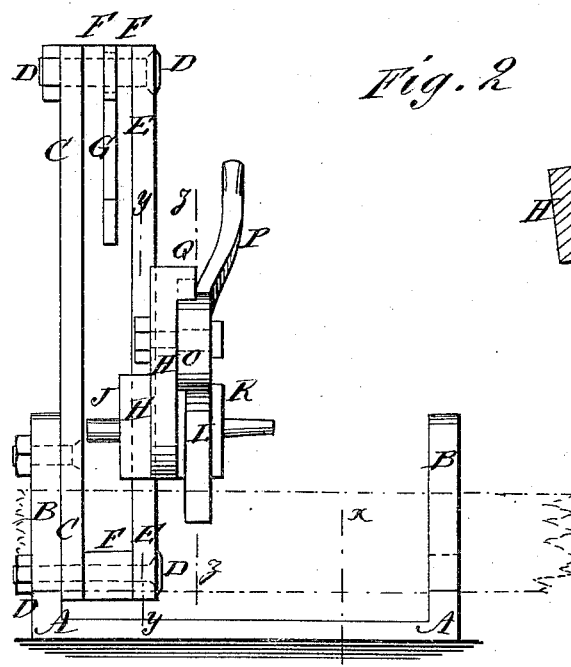
Figure 3:
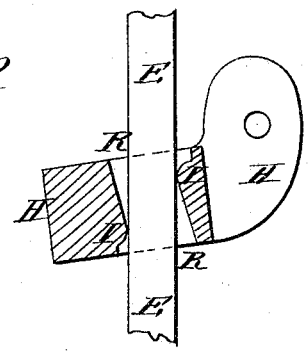
Figure 4:
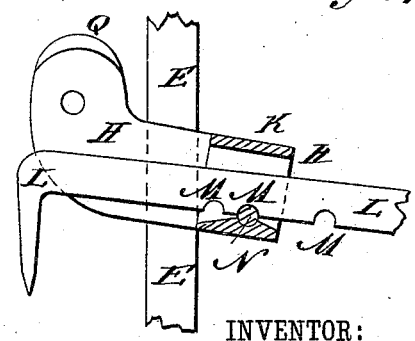

Figure 1 is a side elevation of the improvement, partly in section through the line $x\ x$, Fig. 2. Fig. 2 is a front elevation. Fig. 3 is a sectional elevation taken through the line $y\ y$, Fig. 2. Fig. 4 is a sectional elevation taken through the line $z\ z$, Fig. 2.

Similar letters of reference indicate corresponding parts.

The object of this invention is to furnish dogs for saw-mills so constructed as to hold the timber firmly while being sawed, and which may be easily raised from, lowered to, and forced into the timber.

A represents the saw-mill carriage, and B are the shoulders or knees against which the timber rests while being sawed. To one of the knees B is bolted the standard C, the upper and lower ends of which are bent to the rearward, and have bolts D attached to them. To the bolts D are attached the ends of an upright bar, E. The ends of the bars C E are kept at the desired distance apart by blocks or washers F. Upon the upper bolt, D, is placed a hanging hook, G, to support the dog when raised.

The upright E passes through a mortise, R, in the bar H, which mortise is made slightly inclined, as shown in Fig. 3, and has shoulders I formed upon its alternate corners, so that when the rear end of the bar H is slightly raised the said bar may be slipped up and down upon the upright bar E, and when the bar H is released the weight of the said bar H will cause the shoulders I to bind upon or clamp the upright bar E, as shown in Fig. 3.

Upon the inner side of the bar H is formed or to it is attached a pin, J, to receive the hook G when the bar H is to be supported in a raised position.

Upon the outer side of the rear end of the bar H is formed a keeper or socket, K, to receive the dog L, which dog L has notches M formed in its lower edge to receive a pin, N, passing through and secured to the lower part of the keeper K to prevent the said dog L from slipping out of place while being used. The forward end of the dog L is bent downward, and is sharpened so that it may be forced into the timber. The forward end of the bar H is bent upward, and has a cam, O, pivoted to it to rest upon the upper side of the forward end of the dog L, so that the dog L may be forced into the timber by operating the cam O. The cam O is provided with a lever-handle, P, for convenience in operating it.

Upon the upper edge of the forward end of the bar H is formed a flange, Q, to serve as a stop for the cam O when turned forward to prevent the handle P from dropping so low as to be in the way. With this construction the dog can be conveniently raised and lowered, can be readily forced into the timber, and will hold the timber securely.

Having thus described my invention, I claim as new and desire to secure by Letters Patent—

1. The combination, in a saw-mill carriage, with the rod E, of the dog-carriage bar H, having the inclined mortise R, with shoulders I upon alternate corners, as shown and described.

2. In a saw-mill dog, the combination, with the cam O P and the bar H that carries the dog L, of the stop-flange Q, substantially as herein shown and described, to prevent the cam from being turned too far forward, as set forth.

ELWOOD BENNETT.

Witnesses:
WILLIAM H. BENNETT,
GEORGE C. WRIGHT.